(12) United States Patent
Hisano (10) Patent No.: US 10,317,224 B2
(45) Date of Patent: Jun. 11, 2019

(54) ROUTE RETRIEVAL APPARATUS AND VEHICULAR AUTOMATED DRIVING APPARATUS

(71) Applicant: DENSO CORPORATION, Kariya, Aichi-pref. (JP)

(72) Inventor: Takuya Hisano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/061,346

(22) PCT Filed: Nov. 8, 2016

(86) PCT No.: PCT/JP2016/083096
§ 371 (c)(1),
(2) Date: Jun. 12, 2018

(87) PCT Pub. No.: WO2017/104299
PCT Pub. Date: Jun. 22, 2017

(65) Prior Publication Data
US 2018/0364058 A1    Dec. 20, 2018

(30) Foreign Application Priority Data
Dec. 14, 2015  (JP) .................................. 2015-243145

(51) Int. Cl.
*G01C 21/34*  (2006.01)
*G08G 1/0969*  (2006.01)
(Continued)

(52) U.S. Cl.
CPC ......... *G01C 21/3415* (2013.01); *G01C 21/34* (2013.01); *G05D 1/0212* (2013.01);
(Continued)

(58) Field of Classification Search
None
See application file for complete search history.

(56) References Cited

U.S. PATENT DOCUMENTS

2018/0003516 A1*  1/2018  Khasis .............. G06Q 10/1097
2018/0314253 A1*  11/2018  Mercep ............ G06K 9/00791

FOREIGN PATENT DOCUMENTS

| JP | H09061181 A | 3/1997 |
| JP | H10038596 A | 2/1998 |

(Continued)

*Primary Examiner* — Richard M Camby
(74) *Attorney, Agent, or Firm* — Harness, Dickey & Pierce, P.L.C.

(57) ABSTRACT

A route retrieval apparatus includes: a first storage unit storing map data hierarchized for route retrieval in long distance; a route retriever section retrieving and designating a route from a current position to a destination based on the map data in the first storage unit; a second storage unit storing detailed map data for route retrieval in short distance; a provisional destination designator section designates as a provisional destination a position by a predetermined distance along a travel road based on the map data in the second storage unit when the current position is deviated; and a provisional route retriever section retrieving a provisional route to the provisional destination based on the map data in the second map storage unit, and designating as a route. The route retriever section retrieves a new route from the provisional destination to the destination and designates as a route subsequent to the provisional route.

5 Claims, 5 Drawing Sheets

(51) Int. Cl.
 *G09B 29/10* (2006.01)
 *G05D 1/02* (2006.01)
(52) U.S. Cl.
 CPC ........... *G08G 1/0969* (2013.01); *G09B 29/10* (2013.01); *G05D 2201/0213* (2013.01)

(56) References Cited

FOREIGN PATENT DOCUMENTS

| | | | |
|---|---|---|---|
| JP | 2002312034 A | 10/2002 |
| JP | 2011240816 A | 12/2011 |
| JP | 2015098218 A | 5/2015 |
| JP | 2015133050 A | 7/2015 |
| JP | 2015148533 A | 8/2015 |
| WO | WO-2014073160 A1 | 5/2014 |

* cited by examiner

ROUTE RETRIEVAL APPARATUS AND VEHICULAR AUTOMATED DRIVING APPARATUS

CROSS REFERENCE TO RELATED APPLICATIONS

This application is a U.S. National Phase Application under 35 U.S.C. 371 of International Application No. PCT/JP2016/083096 filed on Nov. 8, 2016 and published in Japanese as WO 2017/104299 A1 on Jun. 22, 2017. This application is based on and claims the benefit of priority from Japanese Patent Application No. 2015-243145 filed on Dec. 14, 2015. The entire disclosures of all of the above applications are incorporated herein by reference.

TECHNICAL FIELD

The present disclosure relates to a route retrieval apparatus and a vehicular automated driving apparatus.

BACKGROUND ART

A system performing an automated driving control for a vehicle needs a control to follow a route designated previously. A route may be designated to an automated driving system as follows: a user designates a destination to a navigation system; the navigation system retrieves a route from a current position to the destination, thereby acquiring the information on route; and the automated driving system is notified of the information on route by the navigation system. The information on route, which the automated driving system is notified of, includes: the information on shapes of roads; the road link IDs; and the branch directions at the branch points, for instance. The automated driving system monitors the situation on periphery of the vehicle using the various kinds of monitoring sensors provided in the vehicle while referring to the detailed map data built in the system for the automated driving, thereby recognizing the road shape ahead of a travel road on which the vehicle travels. Such recognition of the road shape enables the automated driving system to select optimal vehicle speeds or optimal travel roads sequentially while ensuring the safety, enabling an automated driving control to be performed.

Suppose a case where a navigation system is configured to receive the road traffic situations from a road traffic information center. In such a case, the navigation system updates the route information successively depending on changes of the road traffic situations, notifying the automated driving system of the updated route information. The automated driving system can thus perform an automated driving control while reflecting the road traffic information.

PRIOR ART LITERATURES

Patent Literature

Patent literature 1: JP 2015-133050 A
Patent literature 2: JP 2002-312034 A
Patent literature 3: JP 2011-240816 A

SUMMARY OF INVENTION

Incidentally, during an automated driving control for a vehicle to follow a route, the vehicle traveling a travel road may be obstructed by an outbreak event such as interruption by another vehicle, pedestrian's running out, unexpected accident. In such a case, the automated driving system recognizes the outbreak event with the monitoring sensors provided in the vehicle and thus avoids it automatically. This may lead to the deviation of the vehicle from the route. For instance, running straight by failing to turn at an intersection at which the vehicle is expected to turn; branching to a different branch road instead of a proper branch road at a branch point.

The deviation of the vehicle from the route causes the automated driving system to fall into the state of having no route to follow until the navigation system retrieves a new route from the present position to the destination. The retrieval of a route needs a period of time greater as a distance of the route from a current position to a destination is greater; for instance, the retrieval needs several seconds to several tens of seconds. For this period of time for the retrieval, the automated driving system is required to continue under the state of having no route the vehicle is scheduled to travel. This may involve a risk of the vehicle continuing to travel to a place different from a desired destination.

To avoid the state failing to have any route the vehicle is scheduled to travel, the followings are proposed. That is, an automated driving apparatus is proposed which switches between an automated driving and a manual driving to avoid a danger (refer to Patent literature 1). A technique is proposed which performs a safe driving without needing of an emergency stop even at a steep curve (refer to Patent literature 2). Another technique is proposed which prepares a travel plan until the stop of the vehicle at an emergency (refer to Patent literature 3).

However, the above proposals are not going to propose the continuation of the automated driving even after the vehicle is deviated from the route which the vehicle is scheduled to travel. In addition, at a point of time when the automated driving system is notified of a new route retrieved by the navigation system, the vehicle may be supposed to be already deviated from such a new route. This poses a difficulty in cooperating appropriately the automated driving system and the navigation system with each other.

It is an object of the present disclosure to provide a route retrieval apparatus and a vehicular automated driving apparatus which dissolve a state, where any route is not present, in a short period of time, when a vehicle is deviated from a route. An example of the present disclosure includes the following: a first storage unit configured to store map data that are hierarchized to enable a route retrieval in a long distance; a current position specifier section configured to specify a current position; a route retriever section configured to retrieve and designate a route from the current position by the current position specifier section to a destination based on the map data stored in the first storage unit; a second storage unit configured to store detailed map data to enable a route retrieval in a short distance; a provisional destination designator section configured to designate as a provisional destination a position ahead by a predetermined distance along a travel road that is currently travelled based on the map data stored in the second storage unit when the current position specified by the current position specifier section is deviated from the route retrieved by the route retriever section; and a provisional route retriever section configured to retrieve a provisional route to the provisional destination based on the map data stored in the second map storage unit, and to designate the provisional route as a route. Herein, the route retriever section retrieves a new route from the provisional destination to the destination and to designates the new route as a route subsequent to the provisional route.

Under the above configuration, the provisional destination designator section designates a provisional destination that is ahead by a predetermined distance along a travel road currently travelled based on the map data stored in the second storage unit when deviating from the route. The provisional route retriever section retrieves a provisional route to the provisional destination and designates the retrieved provisional route as a route. In contrast, the route retriever section retrieves a new route from the provisional destination to a true destination and designates the new route as a route subsequent to the provisional route. This can dissolve a state failing to have any route in a short period of time, when the vehicle is deviated from the route.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
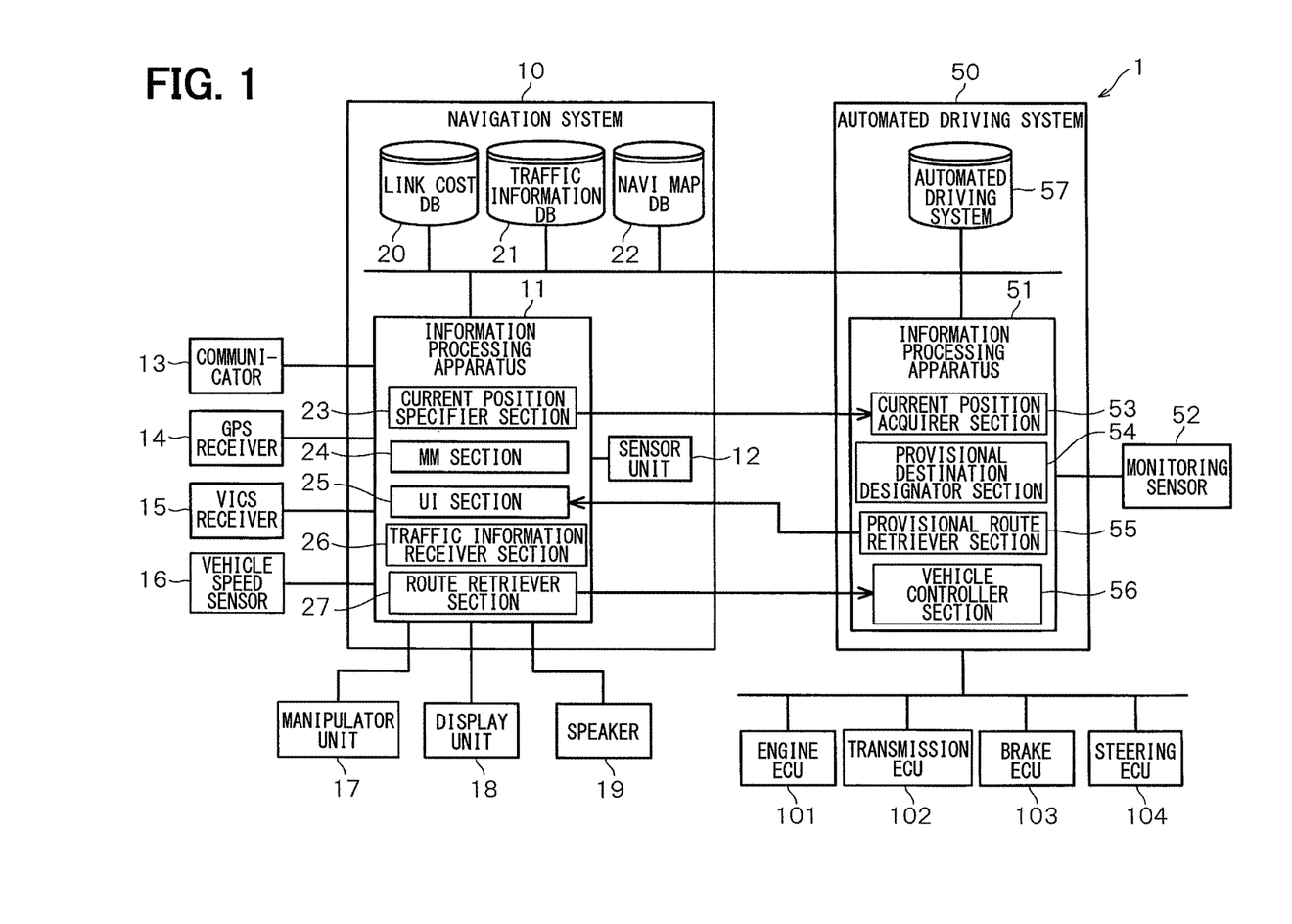
FIG. 1 is a block diagram illustrating a schematic overall configuration according to an embodiment.

An embodiment of the present disclosure will be described with reference to the accompanying drawings. As indicated in FIG. 1, a vehicular automated driving apparatus 1 to a vehicle is configured to include a navigation system 10 (which is also referred to navi system) and an automated driving system 50.

The navigation system 10 is configured to include mainly an information processing apparatus 11. The information processing apparatus 11 performs the various processing based on not only the information from a sensor unit 12 built in the navigation system 10, but also the information from a communicator 13, a GPS receiver 14, a VICS (registered trademark) receiver 15, a vehicle speed sensor 16, an/or a manipulator unit 17, which are connected externally.

The sensor unit 12 includes a gyro sensor that detects rotational movement exerted to the vehicle; an acceleration sensor that detects a travel distance of the vehicle from the acceleration in three axial directions; and a geomagnetic sensor that detects the heading direction of the vehicle from geomagnetism. The sensor unit 12 is thereby enabled to specify a current position of the vehicle even if the GPS receiver 14 fails to receive the GPS signals.

The communicator 13 receives the traffic information from a traffic information center via a cellular-phone base station, outputting the regulation information on roads or the congestion information in a wide range to the information processing apparatus 11. The GPS receiver 14 receives the GPS radio waves from the GPS satellites, outputting the position information for specifying a current position of the vehicle to the information processing apparatus 11.

The VICS receiver 15 receives the traffic information from a VICS center, outputting the regulation information on roads or the road traffic information in a short range in the heading direction of the vehicle, to the information processing apparatus 11. The vehicle speed sensor 16 detects the speed from the rotation speed of the rolling wheel of the vehicle, outputting the speed signal which indicates the speed, to the information processing apparatus 11.

The manipulator unit 17 is a touch panel which is integrated into the display unit 18, or switches arranged around the display unit 18, outputting the manipulation information to the information processing apparatus 11.

The display unit 18 receives a video signal from the information processing apparatus 11, and displays images such as a map for guiding the vehicle to travel, a route to a designated destination, and/or a period of time needed up to a destination.

The speaker 19 outputs a speech indicated by a speech signal received from the information processing apparatus 11. For example, when a route is designated, a direction of a right/left turn at an intersection included in the route, or a branch direction at a branch point included in the route is outputted by speech.

The navigation system 10 is provided with databases. The databases are configured to include a link cost database (hereinafter, link cost DB) 20, a traffic information database (hereinafter, traffic information DB) 21, and a route guidance map database (hereinafter, a navigation map DB) 22 (equivalent to a first storage unit).

The link cost DB 20 stores the data which indicate each link cost in between the nodes of each link in order to calculate link costs. The traffic information DB 21 stores the data such as the data which indicate occurrence road segments of traffic congestions and degrees of the respective traffic congestions, and the data which indicate road segments and contents of traffic regulations, based on the received traffic information.

The navigation map DB 22 stores the map data for displaying maps. The map data include the various data such as: the map matching data for improving position detection accuracy; the road data containing the position information on links (roads) and nodes (intersections, branch points, interchanges, etc.), and the connecting relation information on nodes and links; and the facility data containing the position information and the landmarks on facilities. The navigation map DB 22 has a configuration in which road networks are hierarchized in order to perform long distance route retrievals efficiently. That is, upper layers include coarser road networks only including expressways or major roads; lower layers include finer road networks including minor roads, etc.

The information processing apparatus 11 is configured to include a microcomputer containing a CPU, ROM, RAM, and flash memory (none shown). Based on the program stored in the ROM, the CPU forms several processor sections to achieve a navigation function by performing predetermined processing using: the various signals from the sensor unit 12, the GPS receiver 14, the vehicle speed sensor 16, etc.; the information stored in the databases; and the information stored in the flash memory. The processor sections formed by the CPU include: a current position specifier section 23 which specifies a current position of the vehicle; a map matching (hereinafter, MM) section 24 which specifies a current position specified by the current position specifier section 23 on the map data stored in the navigation map DB 22; a user interface (hereinafter, UI) section 25 which permits a user to designate a destination on the display unit 18, or permits the display unit 18 to display a route to a destination or the traffic information; a traffic information receiver section 26 which receives the traffic information distributed from an outside source; and a route retriever section 27 which retrieves a route from a current position to a destination.

When a destination is designated, the route retriever section 27 performs a route computation using a known navigation technique to obtain an optimal route from a current position specified by the current position specifier section 23 to the destination, based on the current position and the map data stored in the navigation map DB 22, thereby outputting a computation result as the position reference information to the automated driving system 50.

The automated driving system 50 is configured to mainly include the information processing apparatus 51. The information processing apparatus 51 is configured to include a microcomputer containing a CPU, ROM, RAM, and flash memory (none shown). Based on the program stored in the ROM, the CPU forms several processor sections to achieve an automated driving control function by performing predetermined processing using: a signal from the navigation system 10; a signal from the monitoring sensor 52; the information stored in the various databases; and the information stored in the flash memory. The processor sections formed by the CPU include: a current position acquirer section 53 which acquires a current position of the vehicle from the current position specifier section 23 in the navigation system 10; a provisional destination designator section 54 which designates a provisional destination ahead of a travel road the vehicle is traveling by a predetermined distance along the travel road; a provisional route retriever section 55 which retrieves a route from a current position to a provisional destination; and a vehicle controller section 56 (also referred to as a route identifier section) which controls the vehicle to travel to follow a route using the information from the monitoring sensor 52.

The monitoring sensor 52 includes a periphery monitoring camera and/or a radar sensor to detect road lanes or obstacles in the heading direction of the vehicle. The radar sensor is a distance sensor, which outputs air propagation signals such as millimeter waves, laser light, or ultrasonic waves to a detection region within a predetermined range designated ahead of the vehicle, and which receives air propagation signals reflected by an obstacle which is present in the detection region. The radar sensor can detect a direction of the obstacle based on the direction in which the air propagation signals are received, and detect a distance to the obstacle based on a period of time from when the air propagation signals are outputted to when the reflected air propagation signals are received. Another distance sensor may be employed as long as detecting a direction and a distance of an obstacle.

The periphery monitoring camera analyzes an image capturing a periphery of the vehicle using an image recognition technology, thereby specifying a recognized subject such as: a road lane of a current travel road; or a different vehicle, a structure, or a pedestrian as an obstacle detected by a radar sensor; the periphery monitoring camera outputs the relative position information which indicates a relative position between the vehicle and each recognized subject. The periphery monitoring camera may be desirably provided as a plurality of cameras that can capture images in all the perimeter of the vehicle.

The vehicle controller section 56 specifies a route based on the position reference information given by the navigation system 10, performing an automated driving control of the vehicle to travel to follow the route. The automated driving control transmits instruction signals to an engine ECU 101, a transmission ECU 102, a brake ECU 103, and a steering wheel ECU 104, which are mounted in the vehicle. The engine ECU 101 controls an engine throttle opening, an injection quantity, and an ignition timing, etc. The transmission ECU 102 controls a gear ratio of an automatic transmission, etc. The steering wheel ECU 104 controls a steering angle of a steering wheel of the vehicle. The brake ECU 103 controls a braking pressure, an ABS function, and a sideslip preventing function.

The automated driving system 50 is provided with an automated driving map database (hereinafter, an automated driving map DB) 57 (equivalent to a second storage unit). The navigation map DB 22 and the automated driving map DB 57 can refer to each other by using the common information such as road link IDs, representative coordinates of roads, and coordinates of branch points, for example.

The automated driving map DB 57, which is a map DB that stores the information containing road attributes such as the information on shapes of roads and lanes, stores at least the connection information between roads and the regulation information on roads specified by the traffic information. In order to mainly specify the information on shape and lane of a travel road, the automated driving map DB 57 is not hierarchized. In contrast, the automated driving map DB 57 stores mainly the information necessary for an automated driving control, such as the finer road network information, a width and white line marker position of a road or lane, and a finer shape including a 3D shape of a road structure object. A short-distance route retrieval function using the automated driving map DB 57 is similar to a short-distance route retrieval function in the navigation system 10; thus, the short-distance route retrieval function in the automated driving map DB 57 does not need a period of time longer than a period of time needed by a short-distance route retrieval function in the navigation system 10. In contrast, a long-distance route retrieval function in the automated driving map DB 57 is inferior to a long-distance route retrieval function in the navigation system 10 in respect of a period of time needed for the retrieval.

The provisional destination designator section 54 designates a provisional destination that is ahead by a predetermined distance along a travel road currently travelled based on the road information stored in the automated driving map DB 57. The predetermined distance is a distance which the vehicle is estimated to travel for a period of time that is sufficiently less than a period of time for which the navigation system 10 retrieves a new route from a provisional destination to a true destination; for instance, such a distance may be 300 to 700 meters.

The provisional route retriever section 55 retrieves a provisional route from a current position to a provisional destination based on the road information stored in the automated driving map DB 57. The vehicle controller section 56 performs a control process to achieve a known automatic cruise function or a lane keeping function based on the route inputted from the route retriever section 27 and the relative position information acquired by the sensor unit 12. For instance, under the state where the vehicle speed exceeds a predetermined value, the control process using the automatic cruise function follows a preceding vehicle ahead of the vehicle. In contrast, under the state where the vehicle speed is less than the predetermined value, the control process compares the current travel speed of the vehicle with a travel speed of the vehicle which is estimated when running on an adjacent lane, based on the relative position information, thereby changing the lanes when the travel speed estimated in the adjacent lane is faster.

Now, when a user designates a destination to the navigation system 10, the route retriever section 27 calculates the route information by retrieving an appropriate route from the current position to the destination with reference to the traffic information, and notifies the automated driving system 50 of the position reference information corresponding to the route information. The position reference information is expressed in a link format in the map data. The notifying method may notify of the route information relative to all the ranges collectively or may notify of the route information from the range closest to the current position sequentially.

The vehicle controller section 56 in the automated driving system 50 verifies the received position reference information with the automated driving map DB 57, and identifies a route indicated by the position reference information based on the map data stored in the automated driving map DB 57.

When the route is identified as mentioned above, the automated driving system 50 performs an automated driving control for the vehicle to travel to follow the route. When the vehicle is deviated from the route due to a risk avoidance action against an outbreak event, the automated driving control comes to be performed under the state having no route until the new route information is received from the navigation system 10. Further, at the point of time at which the automated driving system 50 is notified of a new route from the navigation system 10, a situation where the vehicle is already deviated from such a new route is supposed to occur. That is, retrieving a new route in the navigation system 10 produces a situation that provides a difficulty to the automated driving system 50 in cooperating with the navigation system 10.

Figure 2:
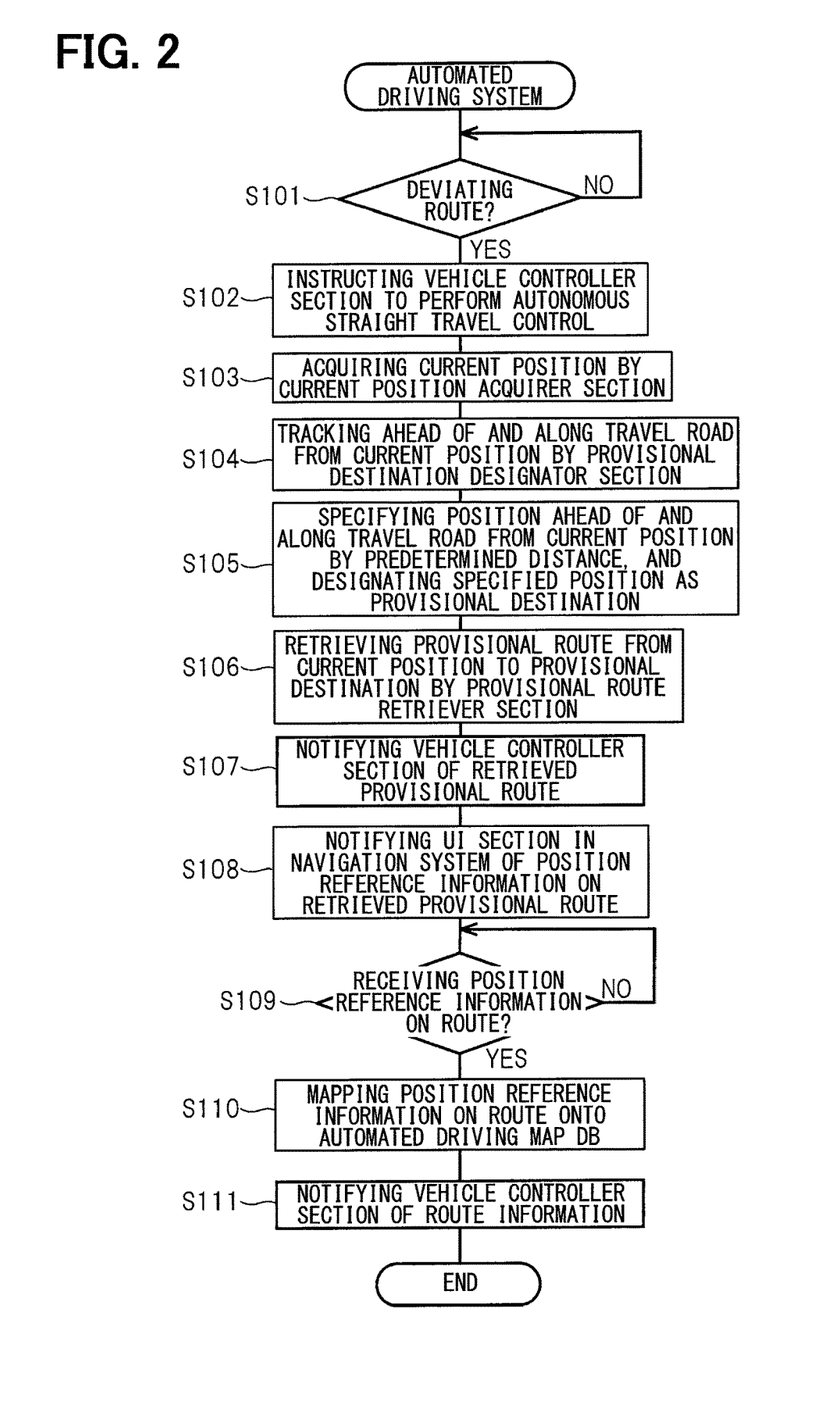
FIG. 2 is a flowchart illustrating an operation of an automated driving system.

From such a situation, the present embodiment enables the automated driving system 50 to cooperate with the navigation system 10 as follows. That is, as indicated in FIG. 2, the automated driving system 50 monitors whether the vehicle is deviated from a route (S101: NO). When the vehicle is deviated (S101: YES), the automated driving system 50 instructs the vehicle controller section 56 to perform an autonomous straight travel control (S102). This autonomous straight travel control performs an automated driving control to control the vehicle to travel to follow a smoothly connected road under the state where any route is not identified, based on the map data stored in the automated driving map DB 57. This smoothly connected road is described as follows. When a travel road meets with an intersection, the vehicle runs at the intersection to enter a straight road that is defined as a smoothly connected road; the straight road is connected with the travel road on the straight at the intersection. When a travel road meets with a branch point, the vehicle runs at the branch point to enter a lane-smoothly-connected branch road as a smoothly connected road; the lane-smoothly-connected branch road is one of branch roads connected with the travel road such that the lane of the lane-smoothly-connected road is connected smoothly with the travel road, with a branch angle closer to zero (on the straight) than that of the other branch road(s). Entering the lane-smoothly-connected road requires the steering wheel to turn less than other branch road(s) does. The automated driving map DB 57 may stores occasionally an attribute of a smoothly connected road with respect to each road.

Figure 4:
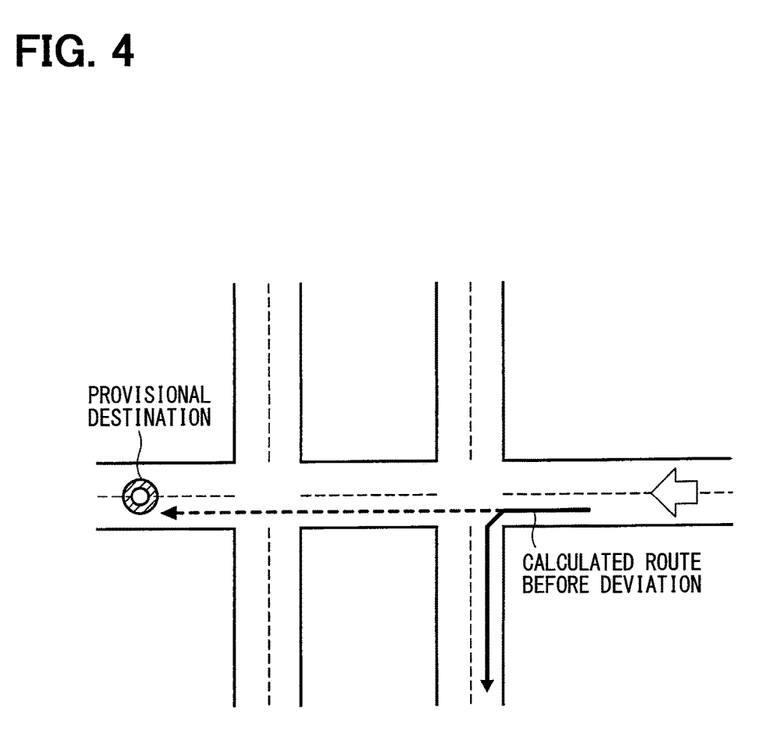
FIG. 4 is a plan view of intersecting roads which indicates a designated position of a provisional destination.

The current position acquirer section 53 then acquires a current position from the current position specifier section 23, and notifies the provisional destination designator section 54 (S103). The provisional destination designator section 54 tracks a smoothly connected road that is a road smoothly connected with a travel road based on the current position and the map data stored in the automated driving map DB 57 (S104), and designates a position along the smoothly connected road as a provisional destination (S105). In other words, S104 is for tracking ahead of and along a travel road from a current position by a provisional destination designator section; S105 is for specifying a position ahead of and along a travel road from a current position by a predetermined distance, and designating a specified position as a provisional destination. The position designated as a provisional destination is a position on a smoothly connected road by a predetermined distance with respect to a travel road, as indicated in FIG. 4.

The provisional route retriever section 55 retrieves a provisional route which connects a current position with a provisional destination based on the map data stored in automated driving map DB 57 (S106), and notifies the vehicle controller section 56 of the provisional route (S107). The vehicle controller section 56 thereby cancels the autonomous straight travel control and comes to perform an automated driving control to follow the provisional route. In this case, since the distance to a provisional destination is short, the provisional route retriever section 55 can retrieve the provisional route in a short period of time.

Figure 5:
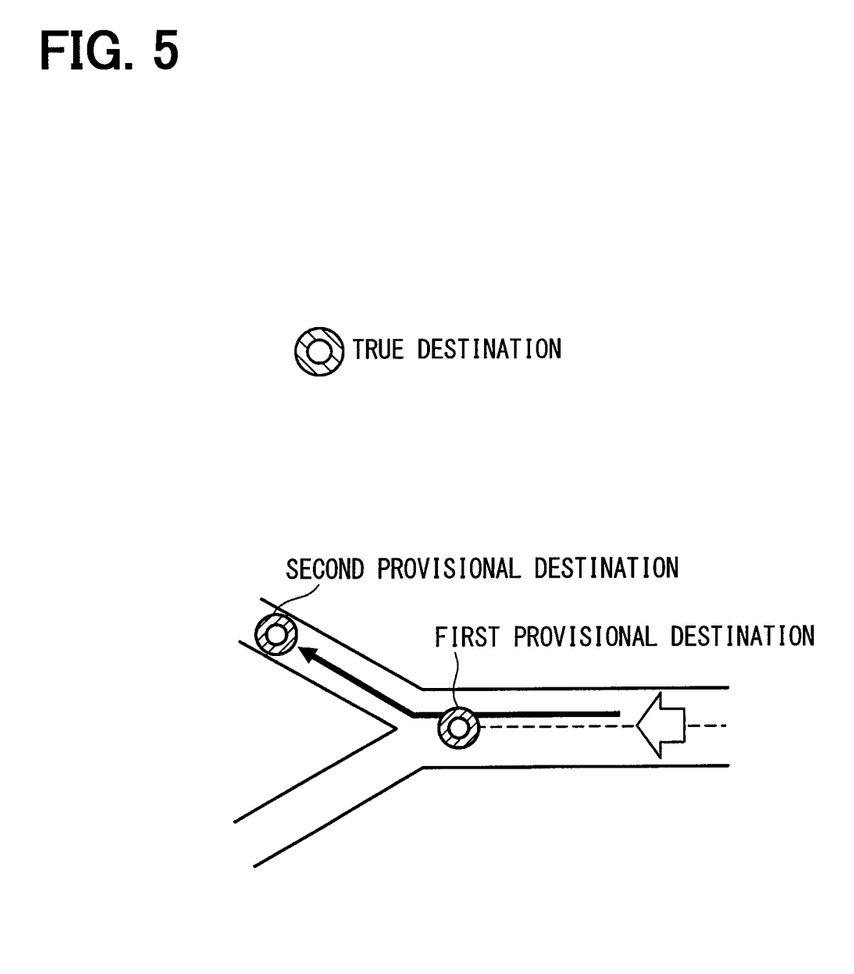
FIG. 5 is a plan view of branch roads which indicates designated positions of provisional destinations.

Suppose a case that a route to a provisional destination includes a branch point where any smoothly connected road is not identified; the smoothly connected road is defined as a road following a travel road. Under such a case, the provisional route retriever section 55 needs a longer period of time for retrieving a provisional route. Thus, a first provisional route is retrieved in a short period of time by designating the branch point as a first provisional destination, while a second provisional route is retrieved in a short period of time by designating, as a second provisional destination, a position on a branch road which is closest to a true destination among a plurality of branch roads. The vehicle controller section 56 thereby enables the vehicle to arrive at the first provisional destination by running to follow the first provisional route, and to arrive at the second provisional destination by running to follow the second provisional route. In this case, the second provisional destination is equivalent to a provisional destination mentioned above.

If a plurality of branch points are present before arriving at a provisional destination, each branch point is defined as a first branch point. Each of routes connecting the respective first branch points is designated as a first provisional route; a route from the last first branch point to a second provisional destination is designated as a second provisional route.

Figure 3:
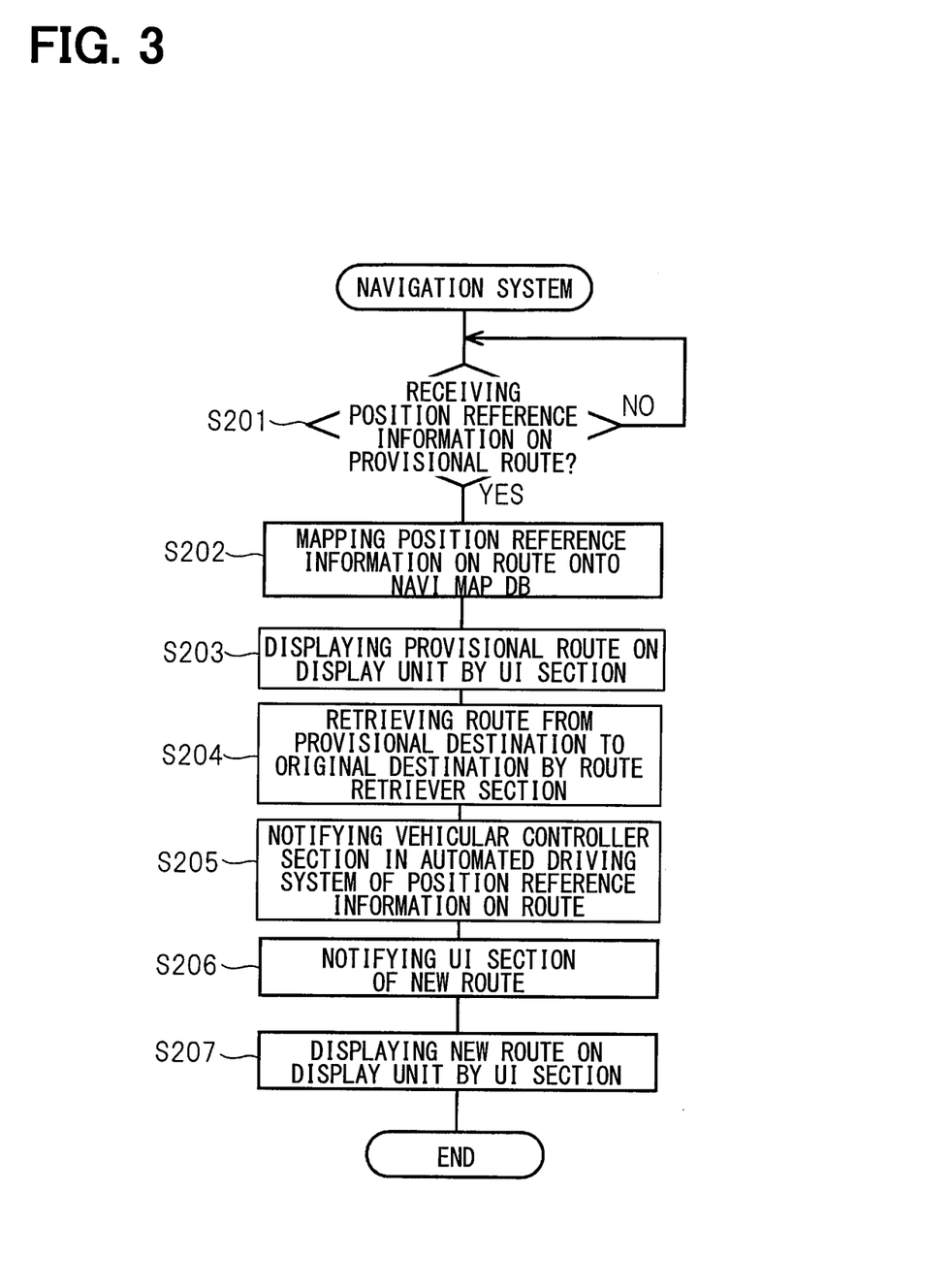
FIG. 3 is a flowchart illustrating an operation of a navigation system.

The automated driving system 50 notifies the UI section 25 in the navigation system 10 of the position reference information on the provisional route retrieved as mentioned above (S108). In contrast, while the automated driving system 50 performs an automated driving control to follow a provisional route, the navigation system 10 operates as illustrated in FIG. 3. That is, the navigation system 10 monitors whether the position reference information on a provisional route is received from the automated driving system 50 (S201: NO). Upon receiving (S201: YES), the position reference information on the provisional route is mapped by the MM section 24 to the navigation map DB (S202), and the provisional route is displayed by the UI section 25 (S203). This allows the user to confirm the provisional route.

A new route from the provisional destination specified in the MM section 24 to the true destination is then retrieved by the route retriever section 27 (S204). The route retriever section 27 in the navigation system 10 is instructed to notify the vehicle controller section 56 in the automated driving system 50 of the position reference information on the new route (S205).

Upon receiving the position reference information on the new route (S109: YES), the vehicle controller section 56 maps the position reference information on the new route to the automated driving map DB 57 (S110). The automated driving map DB 57 notifies the vehicle controller section 56 of the new route (S111). Under this configuration, upon arriving at the provisional destination, the vehicle controller section 56 designates the new route as a route subsequent to the provisional route, performing an automated driving control to follow the new route.

In contrast, the navigation system 10 notifies the UI section 25 of the new route (S206); the UI section 25 displays the new route on the display unit 18 (S207). This allows the user to confirm the new route.

The above-mentioned embodiment can provide the following advantageous effects. The automated driving system 50 contains the automated driving map DB 57 which enables a short-distance route retrieval. When the vehicle is deviated from the route due to a risk avoidance action, the automated driving system 50 designates a position ahead of and along the travel road by a predetermined distance as a provisional destination, and retrieves a provisional route to the provisional destination until the navigation system 10 completes the retrieval of a new route. This configuration can dissolve the state, where there is no route, in a short time.

The predetermined distance is designated as a distance which the vehicle can travel for a period of time sufficiently less than a period of time for which the navigation system 10 can retrieve a new route from a provisional destination to a true destination. The new route can be thus acquired from the navigation system 10 certainly before the vehicle arrives at the provisional destination.

Suppose a case where a plurality of branch points are present before arriving at a provisional destination. In such a case, each of the branch points is designated as a first provisional destination, thereby allowing a first provisional route to the first provisional destination to be retrieved in a short period of time; a branch road leading to a true destination from the branch point is designated as a second provisional destination, thereby allowing a second provisional route to be retrieved. The state where there is no route is thus dissolvable in a short time even if a branch point is present before arriving at a provisional destination.

The provisional route retrieved by the provisional route retriever section 55 and the new route retrieved by the route retriever section 27 are displayed on the display unit 18. This configuration can give a user the sense of security even if the vehicle is deviated from a route.

Other Embodiments

The automated driving system 50 may include a current position specifier section which specifies a current position of the vehicle, in place of the current position acquirer section 53.

Suppose a case where a new route is not acquired from the navigation system 10 even when arriving at a provisional destination. In such a case, another provisional destination may be additionally designated to retrieve another provisional route. The navigation system 10 and the automated driving system 50 may be configured to be integrated to each other.

The route retrieval apparatus may be applied to a navigation system. The navigation system 10 may transmit a new route to the automated driving system 50 at a point of time when the vehicle approaches the provisional destination to be very close to the provisional destination.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

What is claimed is:

1. A route retrieval apparatus, comprising:
   a first storage unit configured to store map data that are used to navigation and hierarchized to enable a route retrieval in a long distance;
   a current position specifier section configured to specify a current position;
   a route retriever section configured to retrieve and designate a route used to the navigation from the current position by the current position specifier section to a destination based on the map data stored in the first storage unit;
   a second storage unit configured to store detailed map data that are used to automated driving to enable a route retrieval in a short distance;
   a route identifier section configured to identify a route used to the automated driving by verifying the route retrieved by the route retriever section with the map data stored in the second storage unit;
   a provisional destination designator section configured to designate as a provisional destination a position ahead by a predetermined distance along a travel road that is currently travelled based on the map data stored in the second storage unit when the current position specified by the current position specifier section is deviated from the route retrieved by the route retriever section; and
   a provisional route retriever section configured to retrieve a provisional route to the provisional destination based on the map data stored in the second map storage unit, and to designate the provisional route as a route,
   wherein the route retriever section is further configured to retrieve a new route from the provisional destination to the destination and to designate the new route as a route subsequent to the provisional route.

2. The route retrieval apparatus according to claim 1, wherein
   the predetermined distance is a distance which the vehicle is estimated to travel sufficiently less than a period of time that is needed by the route retriever section to retrieve the new route.

3. The route retrieval apparatus according to claim 1, wherein:
   when a branch point is present before the provisional destination, the provisional destination designator section designates the branch point as a first provisional destination and designates one of branch roads closer to the destination as a second provisional destination;
   the provisional route retriever section retrieves a first provisional route to the first provisional destination and a second provisional route from the first provisional destination to the second provisional destination; and the route retriever section retrieves a new route from the second provisional destination to the destination.

4. The route retrieval apparatus according to claim 1, further comprising:

a display unit configured to display each of the provisional route and the new route.

5. A vehicular automated driving apparatus to a vehicle, the vehicular automated driving apparatus comprising:

a first storage unit configured to store map data that are used to navigation and hierarchized to enable a route retrieval in a long distance;

a current position specifier section configured to specify a current position;

a route retriever section configured to retrieve and designate a route used to the navigation from the current position by the current position specifier section to a destination based on the map data stored in the first storage unit;

a second storage unit configured to store detailed map data that are used to automated driving to enable a route retrieval in a short distance;

a route identifier section configured to identify a route used to the automated driving by verifying the route retrieved by the route retriever section with the map data stored in the second storage unit;

a monitoring sensor configured to monitor a situation of a periphery of the vehicle;

a vehicle controller section configured to perform an automated driving control to follow a route retrieved by the route identifier section based on the current position specified by the current position specifier section, the map data stored in the second storage unit, and monitoring information monitored by the monitoring sensor;

a provisional destination designator section configured to designate as a provisional destination a position ahead by a predetermined distance along a travel road that is currently travelled based on the map data stored in the second storage unit when the current position specified by the current position specifier section is deviated from the route retrieved by the route retriever section; and a provisional route retriever section configured to retrieve a provisional route to the provisional destination based on the map data stored in the second map storage unit, and to designate the provisional route as a route, wherein:

the route retriever section is further configured to retrieve a new route from the provisional destination to the destination and to designate the new route as a route subsequent to the provisional route; and the vehicle controller section is further configured to perform an automated driving control, which follows the provisional route up to the provisional destination and follows the new route from the provisional destination to the destination.

* * * * *